Oct. 9, 1962    J. W. GILLIAM, JR    3,057,489
CASE POSITIONING BODY FOR TRUCKS
Filed Aug. 5, 1960    2 Sheets-Sheet 1
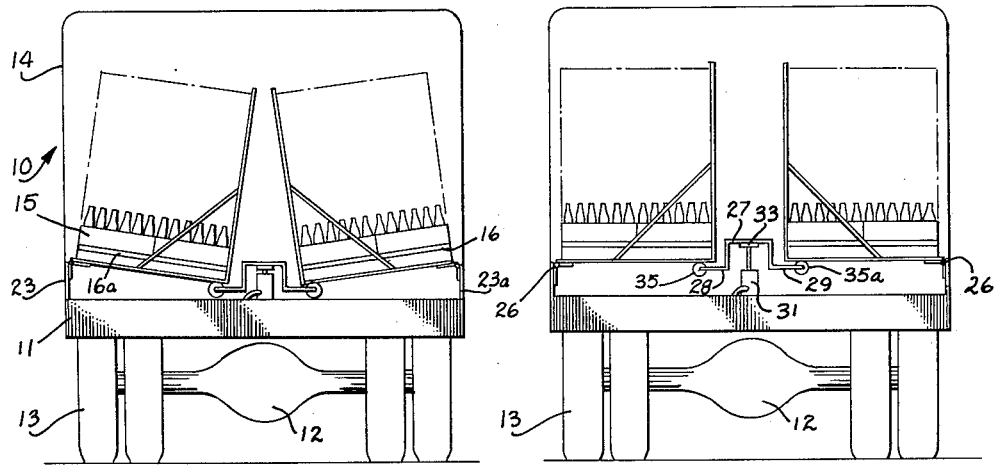
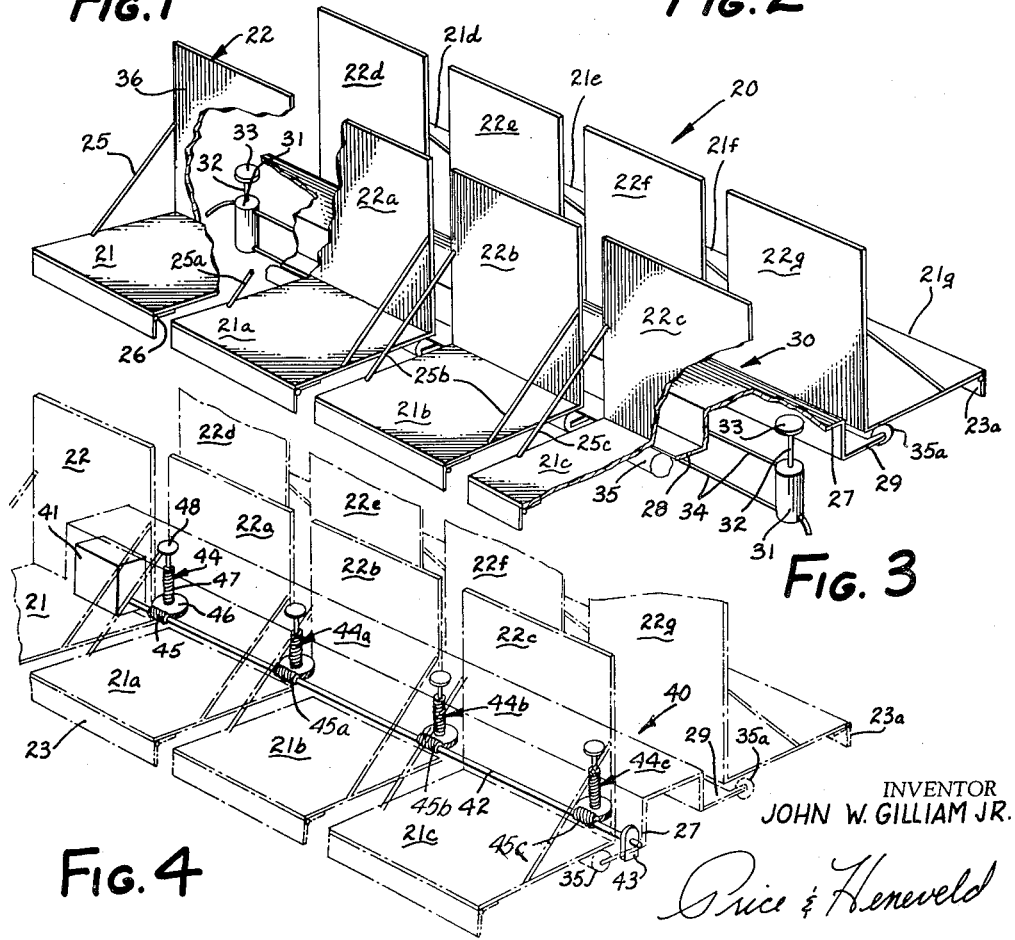
INVENTOR
JOHN W. GILLIAM JR.
Price & Heneveld
ATTORNEYS Oct. 9, 1962   J. W. GILLIAM, JR   3,057,489
CASE POSITIONING BODY FOR TRUCKS
Filed Aug. 5, 1960   2 Sheets-Sheet 2
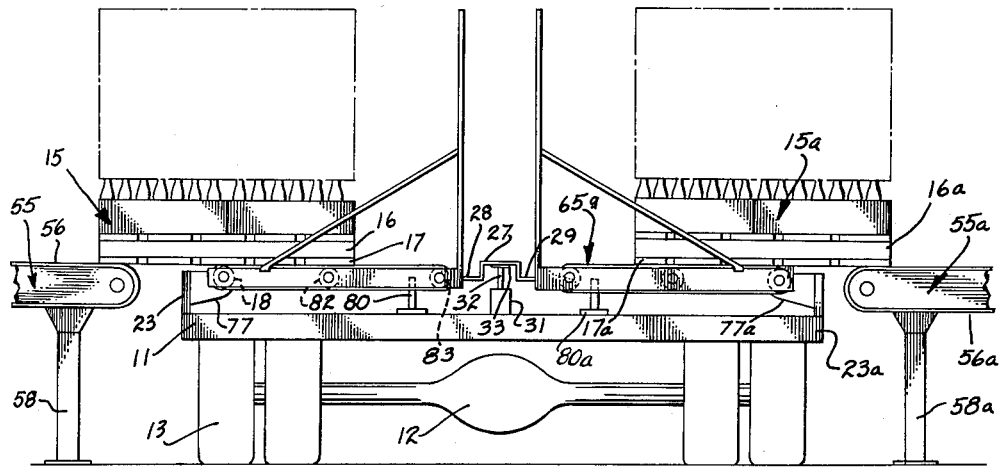
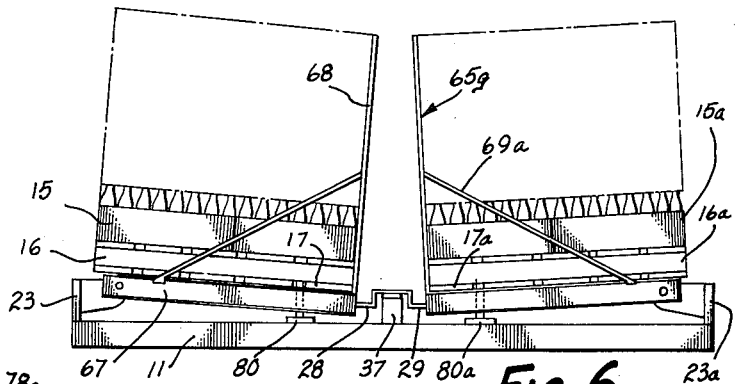
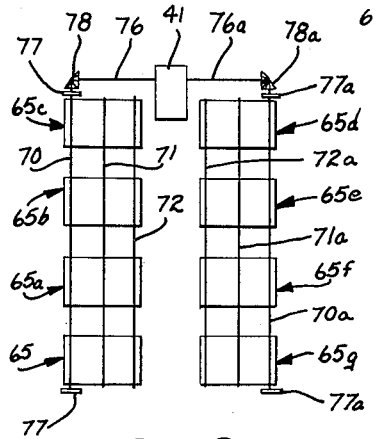
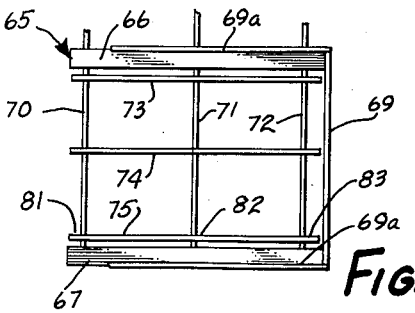
INVENTOR
JOHN W. GILLIAM JR.
BY
ATTORNEY

United States Patent Office 3,057,489
Patented Oct. 9, 1962

3,057,489
CASE POSITIONING BODY FOR TRUCKS
John W. Gilliam, Jr., Dallas, Tex., assignor to John Gilliam Equipment Co., Inc., Dallas, Tex., a corporation of Texas
Filed Aug. 5, 1960, Ser. No. 47,656
4 Claims. (Cl. 214—83.36)

This invention relates to a truck body, and more particularly to a truck body for carrying bottle cases.

It has always been a material handling problem to load and unload cased beverages from a truck. This is particularly true of open-sided trucks which carry cases of bottled liquids such as soft drinks. Since the sides of the truck are open and the cases are stacked one upon the other, it is necessary to prevent the cases from falling off the truck as the vehicle travels its route. A simple and effective way of accomplishing this is to slant the case-carrying racks inwardly or toward the middle so that the cases, if jarred, move toward the center of the truck rather than toward the open sides.

When loading or unloading such a truck, it has been necessary in the past to tilt the forks of the lift truck carrying a load of cased bottles on a pallet so that the pallet will assume the incline of the truck bed. If the pallet is advanced into the side of the truck straight on and then released, the back side of the pallet will fall, slamming the top cases against the inner wall of the load-carrying racks of the truck and often causing breakage to the bottles. Also, with such an arrangement it is necessary to have the top of the truck open or higher than necessary to allow the lift truck to discharge its load onto the load-receiving racks of the truck. Since it is necessary to tilt the forks of the lift truck, additional stabilizing mechanism for the forks is required as compared to purely vertically and horizontally moving lift forks.

It is the object of this invention to overcome these previous difficulties by providing a truck body which can be pallet loaded and unloaded with a fork lift truck without the necessity of tilting the pallet with respect thereto.

It is a further object to provide a truck body which has a series of pivotally mounted load-receiving racks that may be moved from an inclined position with respect to the truck bed to a position parallel to the truck bed.

It is a further object to provide means for pivoting the load-receiving racks from an inclined position to a position parallel to the truck bed.

Still another object of this invention is to provide rack-supporting means which can move the racks on both sides of the truck simultaneously from a load-carrying position to a pallet-receiving or discharging position.

These and other objects and advantages of this invention will be more apparent in the illustration and description of this invention as hereinafter set forth.

In the drawings:

FIG. 1 is an end view of the truck showing the racks tilted or in their load-carrying position;

FIG. 2 is an end view of the truck showing the racks in their upright or pallet-receiving position;

FIG. 3 is a perspective view of the racks and lift mechanism;

FIG. 4 is a perspective view of a modification of FIG. 3 showing a modified form of the lift mechanism, all parts other than the lift mechanism being shown in phantom lines so as not to obscure the details of the lift mechanism itself.

FIG. 5 is an end view of the truck showing still another modified form of the racks in their extended or pallet-receiving position;

FIG. 6 is a segmental view of FIG. 5 showing the load-receiving racks retracted or in their load-carrying position;

FIG. 7 is a plan view of a single load-receiving rack of the modified form shown in FIGS. 5 and 6;

FIG. 8 is a schematic view showing the drive mechanism for the modified form of load-receiving racks of FIGS. 5 through 7.

The truck body 10 disclosed herein generally includes a load-carrying structure 20 consisting of several racks 22 (a through g) pivotally mounted on a truck bed 11 and a lift mechanism 30 or 40 for moving the racks about their pivotal connections.

Referring specifically to the drawings, FIG. 1 shows an end view of the present invention.

The truck 10 has wheels 13 secured to an axle 12 which supports the bed 11 of the truck. The truck 10 is equipped with a body 14 which has open sides for receiving articles 15. Upwardly extending support members 23 and 23a are secured to the truck bed 11, one along each if its side edges. The support members 23 and 23a may be several individual members disposed in spaced end-to-end relationship throughout the length of the truck body and which correspond to the racks, presently to be described, or may be single members which extend throughout the entire length of the truck bed. Load-receiving racks 22, 23a, 22b and 22c are pivotally secured to the member or members 23 by hinges such as 26. Racks 22d, 22e, 22f and 22g are secured to the support member or members 23a. However, they face an opposite open side of the truck body from the racks 22, 22a, 22b and 22c. The racks 22, 22a, 22b and 22c are secured to the support member 23 at equally spaced intervals along the length of the truck body, as are racks 22d, 22e, 22f and 22g.

Since each rack is identical, only the rack 22 will be explained in detail. The rack 22 is L-shaped, having an inner wall 36 integral with the platform or bottom 21 which extends at an angle normal thereto and faces toward the open side of the truck. Tie rods 25 and 25a are secured to the side edges of the wall and bottom of the rack and provide a means for supporting the wall with respect to the bottom.

The racks are pivotally secured to the support members 23 and 23a in two oppositely facing rows. The inner wall 36 of rack 22 is directly adjacent to the inner wall of the rack 22d, and racks 22a, 22e; 22b, 22f; and 22c, 22g are paired in like manner. However, the inner walls of adjacent racks are spaced from one another to allow pivoting about the hinges 26. It should be noted that the racks 22, 22a, 22b and 22c are also axially aligned one with respect to the other as are racks 22d, 22e, 22f and 22g. The space between and below the inner walls of the racks also provides an area for the lift mechanism 30, now to be described.

The lift mechanism 30 is located longitudinally of the truck body 10 between and below the racks 22, as best shown in FIG. 1. A U-shaped channel or lift beam 27 extends between the inner walls of the racks throughout the length of the truck body 10, with the channel opening facing the truck bed 11. Flanges 28 and 29 are formed integrally, respectively, with each leg of the beam 27 and extend outwardly in opposite directions at an angle normal to the legs of the beam. The flanges 28 and 29 are of sufficient width so as to extend well under the rack bottoms on each side of the truck.

Bearing or rollable members 35 and 35a consist of rollers rotatably mounted on the flanges 28 and 29 respectively. The bearing member 35 or 35a can be a single roller extending throughout the length of the flange 28 under each of the racks in each row or can be several rollers, one from each rack in each row.

The lift beam 27 is raised and lowered by hydraulic jacks or lift cylinders 31, positioned at opposite ends of the beam 27. Hydraulic lines 34 supply the jacks with actuating fluid. The hydraulic jacks 31 have actuating rods 32 and platforms 33, respectively. The beam 27 rests upon platforms 33. Thus, upon actuation of the lift portion of hydraulic jacks 31, the beam 27 is raised from the load-carrying position of FIG. 1 to the load-receiving position of FIG. 2. The rack bottoms assume a position substantially parallel to the truck bed when the jacks have been actuated to their raised position. However, upon release of the jacks 31, the racks pivot about the hinges 26 and assume a tilted or load-carrying position. The rack bottoms ride on the bearings 35 and 35a during the raising and lowering operation, which greatly reduces the friction between the racks and the lift mechanism.

Additional hydraulic jacks may be connected into the hydraulic lines 34 and spaced at intervals along the beam 27 to provide additional support to the beam and lifting force, should it become necessary.

FIG. 4 shows a modified form of lift mechanism, designated generally as 40. The rack assembly, lift beam, and lift beam flanges and bearings remain substantially the same as those shown in FIG. 3 and are therefore shown in phantom in FIG. 4 for reference purposes only. The lift beam 27 of FIG. 4 is raised by a series of mechanical screw type jacks. Jacks 44, 44a, 44b and 44c are shown spaced at equal intervals throughout the length of the beam 27. A gear box 41 contains reversing mechanism which powers a rotating shaft 42. The shaft 42 is supported at one end by bearings within the gear box and at the other end by bearing support 43, which is fastened to the bed of the truck. The gear box 41 may be operated by a power take-off mechanism from the drive shaft of the truck (not shown). Shaft 42 carries helical gears 45, 45a, 45b and 45c which are spaced at intervals corresponding to the spacing of the jacks 44, 44a, 44b and 44c. Since each of the jacks 44, 44a, 44b and 44c are identical, only one of these will be explained in detail.

The jack 44 is a conventional screw type jack. The threads of the helical gear 45 engage corresponding threads on the outer diameter of a nut 46 secured against vertical movement by any well-known appropriate means. The screw 44 is threaded into the nut 46 and secured against rotation by any well-known appropriate means. This causes the screw 44 and the platform 48 mounted thereon to be raised and lowered upon rotation of the nut 46. Thus, the rotation of nut 46 by gear 45 on shaft 42 causes translation of the screw 47. Since the gear ratio of each of the jacks 44, 44a, 44b, and 44c is the same, and the jacks are driven by identical gears 45, 45a, 45b and 45c on the shaft 42, the screws of each jack will lift the beam 27 evenly. The beam 27 rests on platforms such as 48 attached to the screws 44 and movable up and down therewith.

*Modification*

The modified form of load-receiving rack is best shown in FIGS. 5 through 8. The series of racks are designated generally as 65 through 65g. Since each of the load-receiving racks 65 through 65g are similar in construction, only the rack 65 will be explained in detail. The rack 65 is best shown in the plan view of FIG. 7.

The rack 65 has bottom rails 66 and 67 which are aligned but are spaced from each other a distance approximately equal to the width of a pallet to be supported thereon. The bottom rails may be channel-shaped or in the shape of an angle iron in cross sectional configuration. The bottom rails 66 and 67 are tied together into an integral unit by the wall 68 secured to the top and end edges thereof. Tie rods 69 and 69a are secured respectively to the bottom rails 67, 66 and to the wall 68 by appropriate means such as welding. Although not shown, the ends of the bottom rails 66 and 67 opposite the wall 68 may be provided with a cross support to lend added rigidity to the rack.

The pivot ends of the bottom rails 66 and 67, the ends of the rails opposite the wall 68, are pivotally mounted on a line shaft 70. An idler shaft 72 is positioned between the bottom rails 66 and 69 at the wall end thereof, and an intermediate idler shaft 71 is positioned midway between the line shaft 70 and end idler shaft 72. Each of the shafts 70, 71 and 72 extends transversely through the bottom rails 66 and 67 and is rotatably journaled therein.

The shaft 70 is provided with a series of drive sprockets 81 fixed at spaced intervals between the bottom rails 66 and 67. Three such sprockets are shown in FIG. 7; however, it is to be understood that more may be added if necessary. Intermediate idler sprockets 82 are secured to intermediate idler shaft 71, and are spaced at intervals along the shaft 71 between the bottom rails 66 and 67 so as to be in alignment with the drive sprockets 81. Likewise, the end idler shaft 72 is provided with a series of end idler sprockets 83 which are aligned with the sprockets 81 and 82.

Conveyor chains 73, 74 and 75 are entrained over the spaced drive sprockets 81, intermediate sprockets 82 and end idler sprockets 83. The various sprockets are of sufficient diameter so as to support the conveyor chains 73, 74 and 75 above the top edges of bottom rails 66 and 67 (FIGS. 5 and 6). Thus, the conveyor chains 73, 74 and 75 provide a support surface for the pallet 16.

FIG. 8 schematically shows the load-receiving racks 65 through 65g as they would appear on the truck body in plan view. The racks 65 through 65c are arranged on one side of the truck and the racks 65d through 65g appear on the other side of the truck.

The wall 68 of rack 65 is in back to back relationship with the wall of rack 65g, as are the other racks 65 through 65c in back to back position with the rack 65f through 65d respectively throughout the length of the truck.

As best seen in FIG. 8, each of the racks 65 through 65c is pivotally mounted on the line shaft 70 which passes transversely through each. The line shaft 70 is journaled in brackets 77 which are secured to the opposite end of support member 23. Intermediate idler shaft 71 and end idler shaft 72 also extend transversely through each of the racks 65 through 65c, and are journaled in the bottom rails of each of these racks. However, the ends of idler shafts 71 and 72 are not journaled in fixed brackets as is shaft 70 but are free to move about the shaft 70. Since each of the racks 65 through 65c is associated with the shafts 71 and 72, they are tied together as a unit which pivots about the line shaft 70.

The racks 65d through 65g on the other side of the truck body 11 are provided with a line shaft 70a, intermediate idler shaft 71a and end idler 72a in a manner similar to the racks 65 through 65c. The line shaft 70a is rotatably journaled in brackets 77a which are secured to opposite ends of support member 23a. Thus, the racks 65d through 65g pivot as a unit about the shaft 70a as a series of racks on the other side of the truck.

The gear box 41 (FIG. 8) is driven from a power take-off shaft (not shown) and provides power for drive shafts 76 and 76a. The drive shaft 76 has a gear connection 78 with line shaft 70. The drive shaft 76a has a gear connection 78a with line shaft 70a. The same gear box 41 that is utilized to drive the jacks 44 through 44c (FIG. 4) may be used to power the drive shafts 76 and 76a if this form of lift mechanism is used. However, if a hydraulic form of lift mechanism is used, a separate power take-off arrangement is necessary. When the drive shafts 76 and 76a are rotated, power is transmitted to the line shafts 70 and 70a, causing rotation of the drive sprockets secured thereto, and in turn movement of the conveyor chains of the various rack members which are entrained over the drive sprocket. Thus a load resting thereupon will be moved. By making the rotation of the drive shaft 76 and 76a reversible, a pallet can be loaded or unloaded from the racks.

To facilitate such loading and unloading dock conveyors 55 and 55a may be positioned on either side of the truck which drives therebetween. The dock conveyors 55 and 55a are supported by standards 58 and 58a respectively which position the conveyors 55 and 55a at the same level as the rack conveyors. The standards 58 and 58a may be in the form of a hydraulic lift for positioning the conveyors 55 and 55a at the proper position should the height of the truck bodies vary. The conveyors 55 and 55a are provided with conveyor belts 56 and 56a which are powered by conventional drive means (not shown). As best seen in FIG. 5, pallets 16 and 16a loaded with beverages can be conveyed directly from the dock conveyors 55 and 55a respectively onto the various rack conveyors without the necessity of a fork truck. The pallet can be unloaded in a similar manner by merely reversing the direction of rotation of the conveyors.

The same lift beam 27 and jacks used in the FIGS. 3 and 4 arrangements may be used to tilt the load-receiving racks 65 through 65g inclusive. However, the bearing members 35 and 35a secured to the beam legs 28 and 29 respectively are not needed with the racks 65 through 65g. Instead, the legs 28 and 29 are designed to have fingerlike portions which engage the end idler shafts 72 and 72a These finger like portions may be provided with nylon sleeve bearings (not shown) in which the shafts 72 and 72a rest to decrease wear on the fingers.

As shown in FIGS. 5 and 6, the pallets 16 and 16a may be provided with spaced pallet slats 17 and 17a respectively. T-shaped stop members 80 and 80a secured to the body 11 of the truck may be positioned so that a leg thereof projects between the slats on the pallets when the load-receiving racks are in the retracted or load-carrying position (FIG. 6). However, when the load-receiving racks are extended to the loading and unloading position as shown in FIG. 5, the stops 80 and 80a do not engage the slats of the pallets and the pallets are free to move in either the loading or unloading directions. A stop 80 and 80a is provided for each of the racks of the series 65 through 65c, and 65d through 65g respectively.

*Operation*

When it is desired to load the truck with a new supply of beverage cases, or unload the truck of empty cases, the following occurs.

The hydraulic jacks 31 and 37, or the shaft 42 and jack 44, are actuated to raise the lift beam 27 which carries thereon the flanges 28 and 29 and the respective bearings 35 and 35a which engage the bottoms of the racks. The racks, upon completion of the lift operation, assume the position show in FIG. 2.

The fork lift truck carrying the pallet loaded with cases of beverages approaches one of the open sides of the truck, lines up with one of the racks, for example, rack 22, and raises the loaded pallet to a level just above the bottom of the rack. The fork lift truck then advances the pallet, lowers the pallet on the rack bottom and retracts the forks. Each rack is loaded in this manner until the truck is finally fully loaded. Thus, the racks can be loaded without the necessity for tilting the forks of the lift truck.

When each of the racks has been loaded or the desired number of racks has been loaded, the hydraulic jacks can be released or the direction of rotation of the shaft 42 reversed, thereby lowering the beam 27, allowing the loaded racks to tip back into their load-carrying position.

The operation of the modified form of load-receiving racks 65 through 65g is basically the same as the operation of the previously described racks, except that the racks 65 through 65g are self-loading and unloading whereas the other racks require a lift truck for loading and unloading.

To operate the racks 65 through 65g, the hydraulic jacks or mechanical jacks are actuated to extend the lift beam 27 which positions the racks 65 through 65g in the loading position as shown in FIG. 5. Assuming the truck is properly positioned between the dock conveyors, the racks 65 through 65c and 65d through 65g will be aligned respectively with the dock conveyors 55 and 55a. By appropriate clutch means (not shown), gear box 41 is actuated causing rotation of the shafts 76 and 76a which in turn rotate the line shafts 70 and 70a. For loading purposes the line shafts 70 and 70a are rotated in a direction so that the conveyor chains of the various racks rotate in a direction toward the walls of the load-receiving racks. The dock conveyors 55 and 55a are also energized and rotate in a direction so as to convey pallet means resting thereon in a direction toward the center of the truck. The pallets 16 and 16a on the dock conveyors 55 and 56 will be moved toward the truck and the ends of the pallets will engage the conveyor chains of the various racks which will continue to transfer the pallets until they come to rest against the walls of the load-receiving racks. A slip coupling may be provided in the shafts 76 and 76a to prevent damage to the drive mechanism and to the load-receiving racks, should the power thereto not be terminated immediately upon the pallets engaging the walls of the load-receiving racks. When the pallets are fully in position on the load-receiving racks, the racks can be retracted lowering the lift beam 27. The load-receiving racks then assume the load-carrying position as shown in FIG. 6. As the racks are lowered, the stop members 80 and 80a will pass between the pallet slats 17 and 17a and lock the pallet securely in position against the walls of the racks.

The pallets are unloaded from the truck in the reverse manner. The jacks extend the lift beam 27 which in turn raises the racks to the unloading position by pivoting them about the line shaft 70 and 70a. The direction of rotation of the shafts 76 and 76a are reversed so that the line shafts 70 and 70a drive the conveyor chains of the various racks in a direction to carry the pallets off from the truck and onto the dock conveyors 55 and 55a. The dock conveyors 55 and 55a are rotated in a direction so as to pick up the pallets from the truck and continue to move them off from the truck.

Although not shown, it is considered to be within the scope of the invention to provide a clutch in the line shafts 70 and 70a between each of the load-receiving racks, or between some of the load-receiving racks, so that individual racks may be unloaded without unloading the remainder of the load. Also, clutches may be placed in the shaft 76 and 76a so that only one side of the truck is unloaded, rather than both sides of the truck being unloaded simultaneously.

It can be seen that the invention disclosed herein provides a simple, safe, and effective way of loading pallets on a truck and particularly a truck of the beverage-carrying type, and of carrying them in a manner to prevent accidential dislodging.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A truck comprising: a truck bed; an open sided housing secured to said bed; support means secured to the opposite sides of said truck bed and extending along the open sides of said housing; a plurality of load-carrying racks each having a bottom and an inner wall, said bottoms having the front edge thereof pivotally connected to said supports and said racks being placed in spaced back-to-back relationship; lift mechanism mounted on said truck bed and engaging said bottoms to move said bottoms between a horizontal loading position and a carrying position, in which said bottoms slope downwardly toward the center of the vehicle whereby said racks may move about said pivotal connection upon actuation of said lift mechanism.

2. A truck for carrying stacked articles comprising a bed, a pair of load-carrying racks loadable from opposite sides of said truck, said racks being pivotally supported by said bed adjacent their outer edges, lifting means acting on said racks adjacent their inner bottom edges for simultaneously raising and lowering said racks between a position in which their bottoms are level and a position in which their inner bottom edges are lower than their outer edges, the bottom load-supporting surfaces of said racks being conveyors, and power means for driving said conveyors.

3. A truck comprising: a truck bed; at least one pair of load-carrying racks each having a bottom and an inner wall and facing in opposite directions, said bottoms having the front edge thereof pivotally supported by said truck bed; a lift mechanism mounted on said truck bed and engaging said bottoms whereby they may move about said pivotal connection upon actuation of said lift mechanism, said rack bottoms being in the form of conveyors for loading and unloading pallets therefrom, power means for driving said conveyors in a loading and unloading direction, and stop means adapted to engage said pallets and maintain them in position on said racks when said lift mechanism is in a retracted position.

4. A truck comprising: a truck bed; an open sided housing secured to said bed; support means secured to the opposite sides of the center line of said truck bed and extending along the open sides of said housing; a plurality of load-carrying racks each having a bottom and an inner wall, said bottoms being pivotally connected to said supports and said racks being placed in spaced back-to-back relationship; lift mechanism mounted on said truck bed and engaging said bottoms to move said bottoms between a horizontal loading position and a carrying position, in which said bottoms slope downwardly toward the center of the vehicle whereby said racks may move about said pivotal connection upon actuation of said lift mechanism.

References Cited in the file of this patent

UNITED STATES PATENTS

| | | |
|---|---|---|
| 684,127 | Swindall | Sept. 6, 1900 |
| 717,293 | Smith | Oct. 1, 1902 |
| 1,765,985 | McHaffie | June 24, 1930 |
| 2,409,870 | Kinnaird | Oct. 22, 1946 |
| 2,596,478 | Gerhardt | May 13, 1952 |
| 2,714,967 | Olsen | May 10, 1955 |
| 2,935,218 | Fritz | May 3, 1956 |
| 2,906,557 | Garabedian et al. | Sept. 29, 1959 |
| 2,968,490 | Baus | Jan. 17, 1961 |

FOREIGN PATENTS

| | | |
|---|---|---|
| 23,180 | Great Britain | Aug. 20, 1903 |
| 761,948 | France | Jan. 13, 1934 |